US005881841A

United States Patent [19]
Mason

[11] Patent Number: 5,881,841
[45] Date of Patent: Mar. 16, 1999

[54] CLOSED OIL DRAINAGE SYSTEM

[76] Inventor: Marion W. Mason, 4147 Greenmead Rd., Winston-Salem, N.C. 27106

[21] Appl. No.: 920,851

[22] Filed: Aug. 29, 1997

[51] Int. Cl.$^{6}$ .................... F16N 21/00

[52] U.S. Cl. .................... 184/15; 184/105.3; 184/106

[58] Field of Search .................... 184/1.5, 106, 6, 184/105.3; 123/196 R

[56] References Cited

U.S. PATENT DOCUMENTS

| | | | |
|---|---|---|---|
| 1,816,004 | 7/1931 | Collier | 184/1.5 |
| 3,967,697 | 7/1976 | Guenther | 184/1.5 |
| 4,101,000 | 7/1978 | Scully | 184/1.5 |
| 4,815,566 | 3/1989 | Caruso et al. | 184/1.5 |
| 5,320,145 | 6/1994 | Avino | 184/1.5 |

*Primary Examiner*—Charles A. Marmor
*Assistant Examiner*—David Fenstermacher
*Attorney, Agent, or Firm*—Rhodes, Coats, & Bennett, LLP

[57] ABSTRACT

A kit adapted to be connected to the oil pan of a vehicle for draining oil therefrom. The kit comprises an adapter that is attachable to the oil pan such that the adapter is generally axially aligned with a drain opening formed in the oil pan. A main body is provided and such is attachable to the adapter. The main body forms a reservoir that includes an outlet port. Contained within the reservoir is a socket and shaft that is operative to unscrew a drain bolt normally secured within the drain opening of the oil pan. In addition, the same socket and shaft is operative to secure the drain plug within the drain opening once oil has been removed from the oil pan.

12 Claims, 1 Drawing Sheet

CLOSED OIL DRAINAGE SYSTEM

FIELD OF THE INVENTION

The present invention relates to a device or kit used to change oil within a vehicle, and more particularly to a kit that is operative to be attached to an oil pan for directing oil from the oil pan into a collector.

BACKGROUND OF THE INVENTION

There are many reasons why large numbers of vehicle owners choose to change the oil in their vehicles themselves. First, many vehicle owners appreciate the importance of proper vehicle maintenance and they know the importance of changing the oil on a regular basis. Further, these vehicle owners that change the oil in their vehicles themselves can be assured that the oil change is performed properly. In addition, many vehicle owners desire to minimize the expense of an oil change by doing the work themselves.

However, self oil changes do have drawbacks. They are time consuming endeavors and can, in certain circumstances, be frustrating. This is because the vehicle must be positioned such that an oil collector can be placed under the oil pan. This can be inconvenient. More over, the person changing the oil must be able to gain access to the oil pan and its drain plug in order to drain the oil from the oil pan. Finally, it is not uncommon for the oil flowing from the oil pan to spill in and around the collector. Thus, in the end, the self-changing of oil can be time-consuming and often the task ends up being a somewhat dirty chore.

Therefore, there is a need for a device or kit that can be used by the vehicle owner to make oil changing relatively simple and easy.

SUMMARY OF THE INVENTION

The present invention entails a kit or system for use by an individual in changing the oil of a vehicle. The kit disclosed herein is designed to make the changing of oil in a vehicle a relatively simple and easy task.

The kit of the present invention comprises an adapter that is designed to be secured to the oil pan adjacent an oil drain opening formed in the pan. Further, the kit includes a main body or reservoir that is attachable to the adapter. A combination socket and shaft is associated with the reservoir or main body. By particularly manipulating the shaft, the socket can be raised into engagement with a drain plug secured within a drain opening in the oil pan. During this time, it is appreciated that the reservoir is secured to the adapter and that the adapter and reservoir form a closed system around the socket. By turning the shaft having the socket formed thereon, the drain plug is unscrewed from the oil pan causing oil to flow from the oil pan into the reservoir or main body. An outlet port formed in the reservoir or main body then directs the oil to a collector.

In a particular embodiment of the present invention, the adapter is designed to be screwed into a threaded opening formed in the oil pan. Forming a part of the adapter is a support that is in turn threaded such that the main body or reservoir can be secured thereto by simply screwing the reservoir onto the threaded support. In this embodiment, the combined socket and shaft is maintained in longitudinal alignment with the drain plug secured within the oil pan. Thus, by simply moving the combination socket and shaft upwardly to where the socket engages the drain plug, the user of the kit can turn the shaft and in the process can either unscrew or screw in the drain plug.

It is therefore an object of the present invention to provide a relatively simple kit that can be used by an individual vehicle owner to change the oil of that vehicle.

Another object of the present invention is to provide an oil changing kit of the character discussed above that is essentially a closed system so as to contain the oil and generally prevent the oil from spilling during the oil draining process.

Another object of the present invention is to provide a kit of the character referred to above that is easy to use.

A further object of the present invention is to provide an oil changing device of the character referred to above that is of a relatively simple design and which can be manufactured relatively inexpensively.

It is a further object of the present invention to provide a means of having a virtually closed oil drainage system between a vehicle oil pan and a ground oil collector which will enhance environmental protection.

Other objects and advantages of the present invention will become apparent and obvious from a study of the following description and the accompanying drawings which are merely illustrative of such invention.

DESCRIPTION OF THE INVENTION

Figure 1:
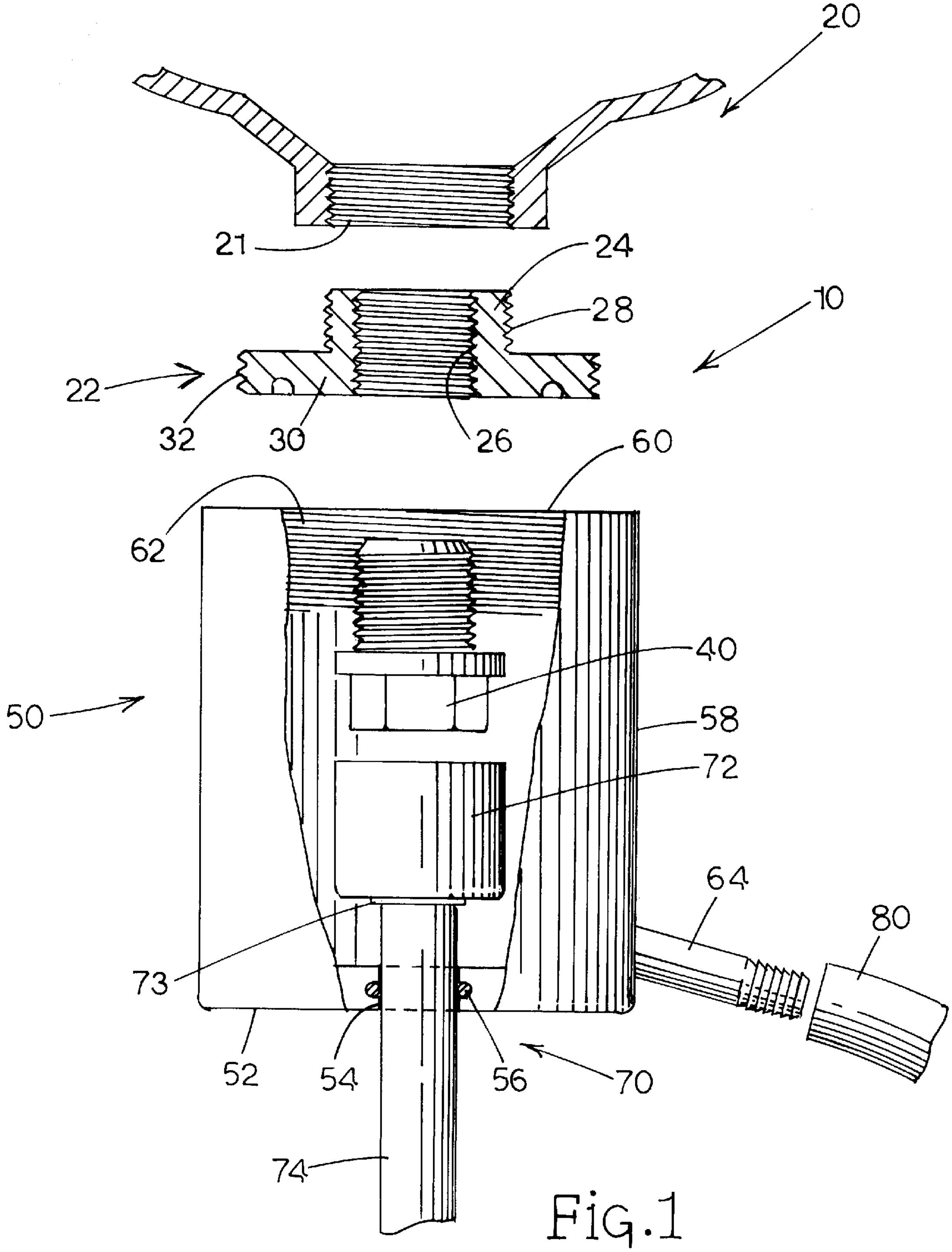
FIG. 1 is an exploded view, partly in section, of the oil changing kit of the present invention.

With further reference to FIG. 1, the oil changing kit of the present invention is shown therein and indicated generally by the numeral 10. The kit 10 is adapted to be secured to an oil pan that is indicated generally by the numeral 20. Oil pan 20 is of any conventional design and includes a threaded drain opening 21. It should be appreciated by those skilled in the art that the kit 10 of the present invention is adapted to work with a variety of different oil pan designs.

Referring in more detail to the oil changing kit 10 of the present invention, the same includes an adapter indicated generally by the numeral 22. Adapter 22 is secured to the oil pan 20 about or in the vicinity of the drain opening 21. Although the adapter 22 can be secured to the oil pan 20 in various ways, in the embodiment illustrated herein, the adapter 22 is designed to screw into the threaded drain opening 21 of the oil pan. As seen in FIG. 1, the adapter 22 includes a sleeve 24 that includes interior threads 26 and exterior threads 28. Exterior threads 28 are designed to screw into the threaded drain opening 21. The interior threads 28, on the other hand, are designed to receive a threaded drain plug 40.

Adapter 22 further includes a support 30 that is associated with the sleeve 24. Support 30 includes a set of exterior threads 32.

Kit 10 further includes a main body or reservoir indicated generally by the numeral 50. As will become apparent from subsequent portions of this disclosure, the main body 50 is adapted to be secured to the adapter 22 which as discussed above, is in turn adapted to be secured to the oil pan 20.

Viewing main body 50 in more detail, it is seen that the same includes a bottom 52. An O-ring 56 is disposed about the circumference of the opening 54. Further, main body 50 includes a surrounding side wall 58 and an open top portion 60. Formed about the open top 60 is a set of interior threads that are formed on the inside of the surrounding wall 58.

Extending from the side wall 58 is an outlet port 64. The outlet port 64 is preferably disposed about the bottom of the main body such that oil can freely drain therefrom. Outlet port 64 is adapted to receive a flexible line 80 that in practice would extend to an oil collector (not shown).

Associated with the main body 50 is a combination socket and extension shaft indicated generally by the numeral 70. The combination includes a conventional socket 72 and an extension shaft 74 that is either fixedly secured to the socket or detachably secured to the socket. As seen in FIG. 1, the shaft 74 extends through the opening 54 formed in the bottom 52 of the main body. Extending around the shaft 74 is the O-ring seal 56 which functions to form a generally fluid-tight seal between the shaft 74 and the bottom 52 of the main body. Shaft 74 is fitted within the opening 56 such that it can be freely moved up and down through the opening 56 and at the same time permit a sealed relationship to exist between the shaft 74 and the bottom 52. Formed in the shaft 74 just below the socket 72 is a groove that is adapted to receive an e-clip 73. The e-clip functions to prevent the shaft 74 from being inadvertently pulled downwardly through the opening 54 in the bottom of the main body. Bottom 52 includes a central opening 54 formed therein. The remote or terminal end of the shaft 74 (not shown) is adapted to be connected to a wrench, ratchet or other turning device.

The embodiment illustrated in FIG. 1 and discussed above is one particular embodiment. Those skilled in the art will appreciate that certain parts or components of the kit could vary in design. For example, the adapter 22 can be secured to the oil pan 20 in various ways. In the way of an example, the adapter 22 can be cemented or glued by a bonding agent to the oil pan in such a fashion that the adapter extends around the drain opening. In addition, the adapter 22 could be provided with a plurality of super magnets that would engage the bottom of the oil pan and which would be particularly aligned with the drain opening by a locating ring or the like disposed around the drain opening of the oil pan.

Now, turning to the use and operation of the oil changing kit 10 of the present invention, the adapter 22 is first secured to the oil pan 20. It is possible that such an adapter 22 could be secured to the oil pan by the vehicle manufacturer or even the dealer. In any event, the original drain plug is removed from the drain opening 21. Thereafter, sleeve 24 is screwed into the drain opening 21 so as to firmly anchor the adapter 22 around the drain opening 21. Next, the replacement or kit drain plug 40, which includes threads particularly sized to fit the interior threads 28 of the sleeve, is secured within the sleeve 24. From this point on, drain plug 40 forms the permanent drain plug for the oil pan. Thus, the adapter 22 assumes at least a semi-permanent connection to the oil pan.

To change the oil in the oil pan 20, the main body or reservoir 50 is simply screwed on to the adapter 22. This is accomplished by screwing the exterior threads 32 of support 30 into the interior threads 62 formed about the inside of the side wall 58. It is appreciated, that the combination socket and shaft 70 remain intact with the main body 50. Generally, the socket 72 rests against the bottom 52 of the main body 50 while the same is being secured to the adapter 22.

Once the main body or reservoir 50 has been secured to the adapter 22, the individual engages the shaft 74 and pushes the shaft 74 and associated socket 72 upwardly until the socket surrounds the lower bolt head portion of the drain plug 40. It is appreciated that the socket 72 is particularly sized to fit the drain plug 40 being used. In addition, it is appreciated that the combination socket and shaft 70 is retained within the main body 50 such that both are generally axially aligned with the drain plug 40 when the main body 50 is attached to the adapter 22.

To drain the oil from the oil pan 20, the socket 72 is pushed up until it surrounds and engages the drain plug 40. Next, the shaft 74 is turned by a ratchet in a direction that unscrews the drain plug 40. Once the drain plug 40 has been screwed from the sleeve 24, the entire drain plug simply sets within the socket 72. Thereafter, the shaft 74 can be lowered to where the socket 72 rests on the bottom 52 of the main body 50. Since the drain plug 40 has been removed, oil freely flows from the oil pan, through the sleeve 24 into the main body or reservoir 50. The O-ring 56 forms a seal between the shaft 74 and the bottom 52 so as to prevent oil from leaking therefrom. Oil accumulated within the main body or the reservoir 50 is drained through the outlet port 64 and on through the flexible line 80 to a collector (not shown).

Once all of the oil has been drained from the oil pan 20, the shaft 74 is pushed back upwardly. This carries the drain plug 40 upwardly to where the same is inserted into the drain opening 21. Now, the shaft 74 is appropriately rotated which causes the drain plug 40 to be screwed into the sleeve 24. It should be understood that in most situations, the ratchet will only be required to loosen or firmly tighten the drain plug. Otherwise, the shaft 74 can be turned by hand. Once the drain plug 40 is securely held within the sleeve 24, the combination socket and shaft 70 can be retracted and the main body or reservoir 50 can be unscrewed from the adapter 22. Thereafter, the vehicle can be filled with oil.

It should be noted that the present invention does not preclude the draining of oil by conventional means even though the adapter may be permanently or semi-permanently attached to the oil pan. Further, it should be appreciated that the present oil drainage system can be incorporated into other fluid holding chambers of a vehicle.

It is contemplated, that the kit 10 of the present invention could also be used to deliver new oil to the oil pan 20. This could be accomplished by utilizing a pump to pump oil from an oil source through the flexible line 80, through the outlet port 64 back into the main body or reservoir 50. The continuous pumping of the oil would then force the oil upwardly through the main body or reservoir 50 into the bottom of the oil pan 50.

From the foregoing specification and discussion, it is seen that the kit 10 of the present invention is of a relatively simple and efficient design that enables oil to be removed from a reservoir or oil pan in an essentially closed system. Therefore, the kit when applied to a vehicle, avoids the spillage of oil and at the same time enables a person to quickly and easily change the oil of a vehicle.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A kit adapted to be connected to a vehicle oil pan for draining the oil therefrom, comprising:

a) an adapter adapted to be connected to the oil pan and including:
   i) a sleeve having both exterior and interior threads with the exterior threads adapted to be secured into a threaded opening formed in the oil pan while the interior threads are adapted to receive a drain plug;
   ii) a threaded support extending from the sleeve;

b) a reservoir adapted to be connected to the threaded support and including a bottom, an opening in the bottom, and a side wall;

c) a socket and shaft combination, including a socket portion and a shaft portion, extending through the opening in the bottom of the reservoir and movable up and down therein, the socket portion being generally confined within the reservoir while the shaft portion extends downwardly through the opening in the bottom and includes a portion that lies exteriorly of the reservoir, and wherein the socket portion can be moved up and down within the reservoir for engagement with the drain plug such that when the reservoir is attached to the adapter the socket portion can be moved upwardly and engaged with the drain plug and thereafter turned so as to remove the same and thereafter the same socket portion while retaining the drain plug can be pushed upwardly and rotated so as to reinsert the drain plug;

d) an O-ring seal formed around the opening in the bottom of the reservoir so as to form a seal between the shaft portion and the opening within the bottom of the reservoir; and e) a drain port extending from the reservoir for draining oil from the reservoir.

2. The kit of claim 1 wherein the threaded support includes a set of exterior threads and wherein the reservoir includes an open top portion and a set of internal threads formed about the open top portion that are adapted to be secured to the exterior threads of the support.

3. A kit adapted to be attached to a fluid reservoir having a drain opening formed therein for draining the fluid therefrom, comprising:

a) an adapter adapted to be secured directly to the fluid reservoir around the vicinity of the drain opening;

b) a main body adapted to be connected to the adapter and including a bottom, a side wall, and an open top;

c) a driver disposed within the main body for engaging a drain plug that is normally secured within the drain opening of the fluid reservoir;

d) a shaft extending from the driver and extending through the main body such that a portion of the shaft lies exteriorly of the main body;

e) wherein the driver and shaft are movable such that the shaft can be moved back and forth through the main body while the attached driver can be moved through the main body for engagement with the drain plug for the purpose of both securing and unsecuring the drain plug; and f) a drain outlet formed in the main body for directing fluid therefrom.

4. The kit of claim 3 wherein the adapter is adapted to be mounted to an oil pan of a vehicle having a drain opening formed therein and wherein the adapter is designed to be generally axially aligned with the drain opening.

5. The kit of claim 4 wherein the bottom of the main body includes an opening for receiving the shaft and wherein the shaft is movable up and down through the opening.

6. The kit of claim 5 wherein when the main body is attached to the adapter the driver and shaft are generally axially aligned with the drain opening of the oil pan such that the combination driver and shaft can be moved up and down through the main body for engaging and holding the drain plug adapted to be secured within the drain opening of the oil pan.

7. The kit of claim 6 wherein there is provided an O-ring seal disposed within the opening within the bottom of the main body so as to form a seal between the shaft and the bottom of the main body.

8. The kit of claim 3 including a drain port formed in the main body.

9. The kit of claim 3 wherein the adapter is designed to be screwed and secured into the drain opening of the fluid reservoir.

10. The kit of claim 9 wherein the adapter includes a threaded sleeve that includes both exterior and interior threads with the exterior threads being adapted to be screwed into the drain opening while the interior threads are adapted to receive a drain plug, and wherein the adapter further includes a support extending from the threaded sleeve that is adapted to be connected to the main body.

11. The kit of claim 10 wherein the support includes exterior threads formed around the support and wherein the main body includes a set of interior threads that are adapted to be screwed onto the exterior threads of the support.

12. The kit of claim 3 wherein the driver includes a socket and wherein the shaft is adapted to be externally driven but is itself movable back and forth through the reservoir and wherein the back and forth movement of the shaft results in the socket being movable within the main body.

* * * * *